United States Patent Office 2,851,431
Patented Sept. 9, 1958

2,851,431

STYRENATED OIL MODIFIED ALKYD RESINS AND THE PROCESS OF PREPARING THE SAME CONTAINING AN ALKYLIDENE BIS-BENZOIC ACID

John C. Petropoulos, Norwalk, Conn., assignor to American Cyanamid Company, New York, N. Y., a corporation of Maine No Drawing. Application January 22, 1957
Serial No. 635,129

17 Claims. (Cl. 260—22)

This invention relates to a novel class of styrenated oil-modified alkyd resins and to the process of preparing the same. Still further, this invention relates to a novel class of styrenated alkyd resins wherein the polycarboxylic acid used in the preparation of the alkyd resin are represented by the general formula:

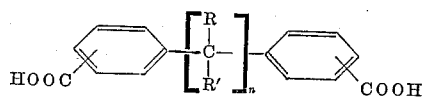

wherein R and R' are alkyl groups containing from 1 to 4 carbon atoms and $n$ is a whole integer between 1 and 2, inclusive.

Still further, this invention relates to a novel class of coating compositions having unusual properties comprising the novel styrenated alkyd resins of the present invention.

One of the objects of the present invention is to produce a novel class of styrenated alkyd resins comprising reacting a glyceride oily material with a polyhydric alcohol and certain dibenzoic acids as defined hereinabove and hereinbelow in greater detail to produce an oil-modified alkyd resin and thereafter, reacting said alkyd resin with a styrene type compound. A further object of the present invention is to produce a styrenated oil-modified alkyd resin by reacting a styrene compound with a glyceride oily material until polymerization is substantially completed and thereafter, adding a polyhydric alcohol and certain dibenzoic acids and heat reacting until esterification is substantially completed. These and other objects of the present invention will be discussed in greater detail hereinbelow.

This application is a continuation-in-part of my earlier application having the Serial No. 523,355, filed July 20, 1955, entitled "Novel Products and Process for Preparing the Same." In that application, there is disclosed the novel dibenzoic acids used in the present invention together with the process of preparing the same and their use in the manufacture of oil-modified alkyd resins.

In the practice of the process of the present invention, one may use either the direct method of making a styrenated oil-modified alkyd resin or the so-called reverse process in which the glyceride oily material is first reacted with the styrene compound until polymerization of the latter is substantially completed whereupon the polyhydric alcohol and the dibenzoic acid are added to the styrenated oil in alkyd forming proportions and heating to substantially complete esterification. In the direct process, the oil-modified alkyd resin is first prepared and is then reacted with the styrene under appropriate polymerizing conditions.

In carrying out the process for the preparation of the oil-modified alkyd resin, one may heat the glyceride oily material with the polyhydric alcohol and the dibenzoic acid until esterification is substantially complete and thereafter, heating the styrene compound in the presence of a peroxide catalyst and an inert organic solvent at a temperature between about 110 and 215° C. until the polymerization of the styrene compound and its interpolymerization with the oil-modified alkyd resin is substantially completed. In the reverse process, the styrenation of the oily material is accomplished in the presence of the peroxide catalyst, but no inert organic solvent is necessary, although one may make use of the same if desired. The temperature at which the styrenation of the oily material is carried out, may be varied between about 140 and 240° C. but preferably between 150 and 180° C. During the esterification reaction, in either the direct process or the reverse process, one may use a temperature range varying between about 200 and 280° C. but preferably between 220 and 240° C.

The glyceride oily material used in the present invention may be either non-drying, semi-drying or drying oils of the glyceride oil variety. In addition to using the glyceride oils themselves, one may make use of the fatty acids derived therefrom or the mono-glycerides of said fatty acids. The amount of oily material used may be varied very substantially in the preparation of these alkyd resins, such as in amounts sufficient to produce short oil alkyd resins, medium oil alkyd resins and long oil alkyd resins. Illustrative of these oils are coconut oil, palm oil, safflower oil, rape seed oil, peanut oil, corn oil, cottonseed oil, soya oil, linseed oil, perilla oil, castor oil, either raw or dehydrated, talloil, oiticica oil, sardine oil, tung oil, whale oil and the like. Additionally, one may make use of certain fatty acids such as lauric acid, stearic acid, palmitic acid and the like. Quite obviously, these oils or fatty acids may be used either alone or in combination with one another.

In the preparation of the alkyd resins of the present invention, one may react an oily material with the dibenzoic acids of the present invention and a polyhydric alcohol such as ethylene glycol, diethylene glycol, trimethylene glycol, tetramethylene glycol, glycerol, trimethylolpropane, trimethyloethane, sorbitol, pentaerythritol, dipentaerythritol, pinacol, arabitol, xylitol, adonitol, mannitol, or the alkane diols and the like. Quite obviously, these polyhydric alcohols may be used either singly or in combination with one another.

Among the dibenzoic acids which may be used in the practice of the process of the present invention are: 4,4'-isopropylidenedibenzoic acid; 4,4'-(2,2-butylidene)dibenzoic acid; 4,4' - (1,1,2,2 - tetramethylethylene)dibenzoic acid; 4,4' - (1,1,2,2-tetraethylethylene)dibenzoic acid; 4,4'-(1,1,2,2 - tetrapropylethylene)dibenzoic acid; 4,4'-(1,1,2,2-tetrabutylethylene)dibenzoic acid; 3,3'-isopropylidene-dibenzoic acid; 2,2'-isopropylidenedibenzoic acid; 4,4' - (1,2-diethyl - 1,2-dimethylethylene)dibenzoic acid; 2,2' - (1,1,2,2 - tetraethylethylene)dibenzoic acid; 2,2' - (1,1,2,2 - tetrabutylethylene)dibenzoic acid; 4,4'-(2,2-butylidene)dibenzoic acid; 3,3'-(2,2-butylidene)dibenzoic acid; 2,2'-(2,2-butylidene)dibenzoic acid; 4,4'-(2,2-pentylidene)dibenzoic acid; 3,3'-(2,2-pentylidene) dibenzoic acid; 2,2'-(2,2-pentylidene)dibenzoic acid; 4,4'-(3,3-pentylidene)dibenzoic acid; 3,3'-(3,3-pentylidene) dibenzoic acid; 2,2'-(3,3-pentylidene)dibenzoic acid; 4,4'-(2,2-hexylidene)dibenzoic acid; 3,3'-(2,2-hexylidene)dibenzoic acid; 2,2'-(2,2-hexylidene)dibenzoic acid; 4,4'-(3,3-hexylidene)dibenzoic acid; 4,4'-(3,3-heptylidene)dibenzoic acid; 3,3'-(3,3-heptylidene)dibenzoic acid; 4,4'-(4,4-heptylidene)dibenzoic acid; 4,4'-(4,4-octylidene)dibenzoic acid; 3,3'-(4,4-octylidene)dibenzoic acid; 2,2'-(4,4-octylidene)dibenzoic acid; 4,4'-(5,5-nonylidene)dibenzoic acid; 3,3'-(5,5-nonylidene)dibenzoic acid; 2,2'-(5,5-nonylidene)dibenzoic acid.

The styrenated alkyd resins of the present invention may be prepared by copolymerizing the oil-modified alkyd resins with styrene-type compounds such as styrene, alpha-methyl styrene, alpha-ethyl styrene, alpha-chlorostyrene, and the ring substituted styrenes such as the ortho, meta, and para-alkyl styrenes such as the ortho-methyl styrene, meta-methyl styrene, p-methyl styrene, meta-ethyl styrene, p-propyl styrene and the like; or the disubstituted styrenes such as 2,4-dimethylstyrene, 2,5-diethyl styrene, and 3,4-dipropyl styrene and the like; or the ring substituted mono and dihalo styrenes such as ortho, meta or para-chloro styrenes or 2,4-dichlorostyrene or 2,5-dibromostyrene and the like.

Additionally, one could make use of such polymerizable monomers as the alkyl acrylates and methacrylates such as methyl methacrylate, methyl acrylate, and the like; or the nitriles such as acrylonitrile, methacrylonitrile, ethacrylonitrile, and the like. These polymerizable monomers may be used either singly or in combination with one another.

It has been indicated hereinabove, that in the styrenation step, whether it be of the oil-modified alkyd resin or of the oily material itself, one should make use of peroxide catalyst of which there are a considerable number known in the art. Illustrative of these catalysts are benzoyl peroxide, acetyl peroxide, ketone peroxides such as methylethyl ketone peroxide, cyclohexyl peroxide, 1-hydroxycyclohexyl hydroperoxide-1, tertiary butyl diperphthalate, tertiary butyl perbenzoate, tetralin hydroperoxides, cumene hydroperoxide, or the tertiary alcohol hydroperoxides, or the ditertiary alkyl peroxides or, more specifically, tertiary butyl hydroperoxide, ditertiary butyl peroxide, 2,2-bis(tertiary butylperoxy)butane, tertiary butylpropyl peroxide, tertiary butylpentamethylethyl peroxide, pinane hydroperoxide, and the like. These peroxide catalysts may be used either singly or in combination with one another. The amount of the catalytic material used may be varied over a fairly wide range such as from about 0.5% to about 5% by weight based on the total weight of coreaction materials. Preferably, one would use from about 1% to about 2% by weight based on the total weight of reactants.

It has been indicated hereinabove that when the direct process is used, one should make use of an inert organic solvent of which there are a considerable number known in the art including such solvents as benzene, toluene, xylene, Varsol 1, Varsol 2, P-1 ink oil, P-2 ink oil (high boiling aliphatic petroleum hydrocarbons of low kauri-butanol value), deodorized petroleum solvent No. 590, deodorized petroleum solvent No. 470, No. 80 white oil, and the like. Additionally, one may make use of such conventional solvents as kerosene, Ultracene and the like. These inert organic solvents may be used either singly or in combination with one another.

If the styrenated oil-modified alkyd resins of the present invention are to be used as clear coating compositions such as varnishes, lacquers and the like, one need not resort to the use of pigments or other coloring materials. However, if one wishes to make colored enamels, one may make use of such pigments as chrome yellow, carbon black, lithol toners such as lithol red, toluidine toners, phthalocyanine blue, phthalocyanine green, phosphotungstic acid toners, aluminum hydrate lakes, hanza yellow, fire red toner, molybdate orange, chrome orange, benzidine yellow, titanium oxide white and the like. Additionally one may make use of dyes such as rhodamine, methyl violet, Victoria blue, chrysoidine (base), malachite green and the like.

In order that the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

ALKYD RESIN A

Into a suitable reaction vessel equipped with thermometer, stirrer and reflux condenser and an inert gas inlet and outlet tube, there is introduced 298 parts of 4,4'-(2,2-butylidene)dibenzoic acid, 235 parts of soya oil fatty acids and 107 parts of 98% glycerol. The charge is heated gradually to 220° C. and held at 220–230° C. until an acid number of 9.1 is reached. A sample of the resin is then cut to 55% solids in xylol and has a viscosity of Y—Z on the Gardner-Holdt scale at 25° C.

ALKYD RESIN B

Into a suitable reaction vessel equipped as before, there is introduced 284 parts of 4,4'-isopropylidene-dibenzoic acid, 235 parts of soya oil fatty acid and 107 parts of glycerol (98%) and the charge is heated gradually to about 220° C. and held at 220–230° C. until an acid number of 9.8 is reached. A sample of the resin cut to a 60% solids content with xylol had a viscosity of R on the Gardner-Holdt scale at 25° C.

ALKYD RESIN C

Into a suitable reaction vessel equipped as before, there is introduced 312 parts of 4,4'-(3,3-pentylidene)dibenzoic acid, 245 parts of soya oil fatty acids and 109 parts of glycerol (98%). The charge is heated gradually to a temperature of about 220° C. and is held at 220–230° C. while passing nitrogen through the system until an acid number of 10.8 is reached. A sample of the resin cut to 55% solids with xylol had a viscosity of Z on the Gardner-Holdt scale at 25° C.

ALKYD RESIN D

Into a suitable reaction vessel equipped as before, there is introduced 298 parts of 4,4'-(2,2-butylidene)dibenzoic acid, 120 parts of dehydrated castor oil fatty acids, 115 parts of soya oil fatty acids and 107 parts of glycerol (98%). The charge is heated gradually to 220° C. and while passing an inert gas therethrough, is held at 220–230° C. until an acid number of 12.3 is reached. A sample of the resin cut with xylol to a 55% resin solids content had a viscosity of X+ on the Gardner-Holdt scale at 25° C.

*Example 1*

Into a suitable reaction vessel equipped with thermometer, stirrer and reflux condenser, there is introduced 75 parts of Alkyd Resin A (solids), 25 parts of monomeric styrene, 100 parts of xylol and 2 parts of 2,2-bis(tertiary butylperoxy)butane. The charge is heated gradually to the reflux temperature and is held at that temperature for a period of about 5 hours at which point, polymerization is substantially completed. The resulting interpolymer resin solution had a viscosity of Z on the Gardner-Holdt scale at 25° C. A film is drawn down on a glass plate using this interpolymer resin solution and is allowed to air-dry. The film dried to a tack-free condition in about 25 minutes. The resultant film was hard, glossy and displayed resistance to acids, alcohols and alkalies.

*Example 2*

Into a suitable reaction vessel equipped as in Example 1, there is introduced 60 parts of Alkyd Resin A (solids), 40 parts of monomeric styrene, 100 parts of xylol and 2 parts of 2,2-bis(tertiary butylperoxy)butane. The charged materials are heated gradually to the reflux temperature and held at that temperature for a period of about 5 hours to which time, the polymerization is substantially complete. The viscosity of the resultant resin solution is about Z on the Gardner-Holdt scale at 25° C. The film drawn down from said resin solution, dried in the air to a tack-free condition in about 15 minutes. The resultant film was hard, glossy, and displayed resistance to acids and alkalies and was scratch resistant.

*Example 3*

Into a suitable reaction vessel equipped as in Example 1, there is introduced 65 solids parts of Alkyd B and 100 parts of xylene. The charge is heated gradually to the reflux temperature whereupon there is added a mixture of 1 part of ditertiary butyl peroxide dissolved in 35 parts of a monomeric material comprising 65% p-methyl styrene, 33% o-methyl styrene and 2% m-methyl styrene. The monomer catalyst mixture is added in small increments slowly over a 1 hour period. After the monomer catalyst addition is completed, the entire charge is held at the reflux temperature for a period of about 5 hours. The viscosity of the resultant interpolymer resin solution is about Z on the Gardner-Holdt scale at 25° C. A film drawn down therefrom and allowed to air-dry becomes tack-free in about 15 minutes. The film, thus produced, displayed substantially all of the desirable properties of the films of the previous examples.

*Example 4*

Into a suitable reaction vessel equipped as in Example 1, there is introduced 70 parts of Alkyd Resin C (solids) and 100 parts of xylene. The charge is heated gradually to the reflux temperature whereupon there is added 30 parts of 2,4-dimethyl styrene containing dissolved therein 1 part of ditertiary butyl peroxide. The monomer catalyst mix is added dropwise over about a 1-hour period while holding the reaction vessel at the reflux temperature. After the addition of the monomer catalyst mix is completed, the charge is held at reflux for an additional 5-hour period. The resultant resinous solution had a viscosity of about $Z_2$ on the Gardner-Holdt scale at 25° C. A film drawn down from said resinous solution, air-dried in about 18 minutes to a tack-free condition. The resultant film was glossy, hard and scratch resistant and displayed resistance to attack by alkali and acid.

*Example 5*

Into a suitable reaction vessel equipped as in Example 1, there is introduced 60 parts of Alkyd Resin D (solids) and 100 parts of xylene. The charge is heated to the reflux temperature and while being held at that temperature, there is added a solution of 2 parts of cumene hydroperoxide dissolved in 40 parts of monomeric styrene. The addition of the styrene catalyst mix is accomplished gradually over about a 1-hour period while holding the charge at reflux. On completion of the monomer catalyst addition, the charge is held at reflux for an additional 5 hours. The resultant resinous solution had a viscosity of about $Z_2$ on the Gardner-Holdt scale at 25° C. A film drawn down therefrom on a glass plate was permitted to air-dry to a tack-free condition in 15 minutes. The resultant film had properties comparable to those produced hereinabove.

*Example 6*

Into a suitable reaction vessel equipped as before, there is introduced 66.67 parts (solids) of Alkyd Resin D and 100 parts of xylene. The charge is heated to the reflux temperature and while being held at that temperature, there is added slowly, in small increments over a period of 1 hour, a solution of 2 parts of pinane hydroperoxide dissolved in 33.33 parts of monomeric styrene. After the styrene catalyst addition is completed, the charge is held additionally at the reflux temperature for about 5 hours. The resultant resinous solution had a viscosity of about $Z_3$ on the Gardner-Holdt scale at 25° C. A film drawn down from the resin solution was permitted to air-dry to a tack-free condition which took about 18 minutes. The resultant film had substantially the same properties as those films produced according to the previous examples.

ALKYD RESIN E

Into a suitable reaction vessel equipped as in Alkyd Resin A, there is introduced 298 parts of 4,4'-(2,2-butylidene)dibenzoic acid, 300 parts of linseed oil fatty acid and 113 parts of glycerol (98%). While passing nitrogen through the system, the charge is heated gradually to 220° C. and held at 220–230° C. until an acid number of about 9–10 is reached.

*Example 7*

Into a suitable reaction vessel equipped as in Example 1, there is introduced 75 parts of Alkyd Resin E (solids) and 100 parts of mineral spirits. The charge is heated gradually to reflux (about 170° C.) and there is added thereto, a solution of 2 parts of ditertiary butyl peroxide dissolved in 25 parts of styrene over a 2-hour period. When the styrene catalyst addition is completed, the charge is held at reflux temperature for about 3 hours longer. The resultant resinous solution had a viscosity of about $Z_4$ on the Gardner-Holdt scale at 25° C. A film drawn down from said resinous solution, air-dried to a tack-free condition in about 60 minutes. The resultant film was glossy, hard and mar resistant and was further resistant to attack from alkali and acid.

*Example 8*

Into a suitable reaction vessel equipped as before, there is introduced 60 parts of Alkyd Resin E (solids) and 100 parts of mineral spirits. The charge is heated gradually to reflux temperature and while being maintained at that temperature, there is added thereto gradually over a 2-hour period, a solution of 2 parts of ditertiary butyl peroxide dissolved in 40 parts of a composition comprising 65% p-methyl styrene, 33% o-methyl styrene and 2% of m-methyl styrene. When the monomer catalyst mixture is completely added, the system is maintained at reflux for about an additional 3-hour period. The resultant resinous solution had a viscosity of about $Z_1$—$Z_2$ on the Gardner-Holdt scale at 25° C. A film drawn down from said solution, air-dried to a tack-free condition in 45 minutes.

*Example 9*

Into a suitable reaction vessel equipped with thermometer, stirrer and reflux condenser, there is introduced 402 parts of tall-oil fatty acids which are then heated to about 150° C. While maintaining this temperature, there is added slowly thereto, a mixture of 12 parts of ditertiary butyl peroxide dissolved in 405 parts of styrene. This addition is accomplished over about a 4-hour period while maintaining the temperature at 150° C. After the addition is completed, the charge is maintained at 150° C. for an additional 3-hour period, at which point, the polymerization of the styrene is substantially completed. 660 parts of styrenated talloil fatty acids, thus produced, are blended with 298 parts of 4,4'-(2,2-butylidene)dibenzoic acid and 115 parts of glycerol (98%). The entire charge is heated gradually to about 220° C. and maintained at about 220–230° C. until an acid number of 40 is reached. A sample of this resinous composition, when cut to a 50% solid solution in xylol, had a viscosity of $Z_4$—$Z_5$ on the Gardner-Holdt scale at 25° C. A film drawn down from this resinous solution, air-dried to a tack-free condition in about 15 minutes. The resultant film was glossy and hard.

*Example 10*

Into a suitable reaction vessel equipped as in Example 9, there is introduced 800 parts of linseed oil fatty acids and these acids are heated to about 150° C. and while being maintained at that temperature, there is added gradually over about a 4-hour period, 24 parts of 2,2-bis(tertiary butylperoxy)butane dissolved in 600 parts of a monomer mixture comprising 65% p-methyl styrene, 33% o-methyl styrene and 2% m-methyl styrene. When the addition is substantially completed, the heating is continued at about 150° C. until polymerization is substantially completed which takes slightly more than 3 additional hours. 800 parts of the styrenated linseed fatty acids, thus produced, are mixed with 284 parts of 4,4'-isopropylidene dibenzoic acid and 120 parts of glycerol (98%). The mixture is heated gradually to 230° C. and maintained at about that temperature until an acid number of less than 10 is reached. A sample of the resin is cut to a 50% solids solution in mineral spirits and a film drawn down therefrom, air-dried to a tack-free condition in about 1 hour. The resultant dried film was glossy, hard and displayed mar resistance and resistance to attack from acid and alkali.

The oil alkyd resin used in the present invention may be either long oil, short oil or medium oil alkyd resins as are well known in the art. In preparing a long oil alkyd resin, the dicarboxylic acid will amount to about 20–30% by weight based on the total weight of the alkyd resin whereas the short oil alkyd resin will generally contain 40–50% by weight of the dicarboxylic acid based on the total weight of the alkyd resin. Medium oil alkyd resins will generally contain about 30–40% by weight of the dicarboxylic acid based on the total weight of the alkyd resin. The amount of polyhydric alcohol used in the preparation of the alkyd resin, whether by the direct or reverse process, should be at least slightly in excess of the stoichiometrical amount required to completely esterify the polycarboxylic acid. The excess is preferably between about 5% and 25% over and beyond the stoichiometrical amount required for complete esterification.

The amount of styrene type compound which may be used to modify the oil alkyd resin may be varied over a fairly wide range such as when modifying short oil alkyd resins, 10% by weight based on the total weight of resin and monomer, up to 50% by weight for long oil modified alkyd resins.

If it is desired to accelerate the drying rate of the resinous compositions of the present invention, one may incorporate therein conventional amounts of metallic driers such as the naphthenates or more specifically, cobalt naphthenate, lead naphthenate, copper naphthenate, zirconium naphthenate or the octoates such as lead octoate, cobalt octoate and zirconium octoate, calcium octoate and the like. These driers may be used either singly or in combination with one another.

The principal end use of the novel compositions of the present invention will be in the field of surface coating resins such as in the coating of wood, metal, glass, paper and the like. Additionally, the compositions of the present invention will have utility in the fields of textile treating, leather, printing inks and adhesives, among other utilities.

I claim:

1. A process comprising reacting a styrene selected from the group consisting of styrene, alkyl styrenes and halo styrenes with an oil modified alkyd resin at a temperature between 110 and 215° C. in a mutually inert solvent and in the presence of a peroxide catalyst, wherein said oil modified alkyd resin is prepared by reacting (1) a member selected from the group consisting of glyceride oils, their fatty acids and their monoglycerides, (2) a polyhydric alcohol and (3) a polycarboxylic acid having the general formula:

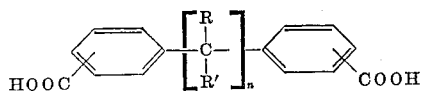

wherein R and R′ are alkyl groups containing from 1 to 4 carbon atoms and n is a whole integer between 1 and 2, inclusive.

2. A process comprising reacting a ring-substituted alkyl styrene with an oil modified alkyd resin at a temperature between 110 and 215° C. in a mutually inert solvent and in the presence of a peroxide catalyst, wherein said oil modified alkyd resin is prepared by reacting (1) a member selected from the group consisting of glyceride oils, their fatty acids and their monoglycerides, (2) a polyhydric alcohol and (3) a polycarboxylic acid having the general formula:

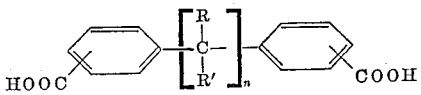

wherein R and R′ are alkyl groups containing from 1 to 4 carbon atoms and n is a whole integer between 1 and 2, inclusive.

3. A process comprising reacting a ring-substituted methyl styrene with an oil modified alkyd resin at a temperature between 110 and 215° C. in a mutually inert solvent and in the presence of a peroxide catalyst, wherein said oil modified alkyd resin is prepared by reacting (1) a member selected from the group consisting of glyceride oils, their fatty acids and their monoglycerides, (2) a polyhydric alcohol and (3) a polycarboxylic acid having the general formula:

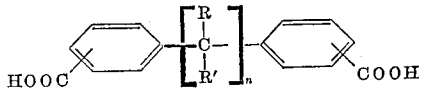

wherein R and R′ are alkyl groups containing from 1 to 4 carbon atoms and n is a whole integer between 1 and 2, inclusive.

4. A process comprising reacting p-methyl styrene with an oil modified alkyd resin at a temperature between 110 and 215° C. in a mutually inert solvent and in the presence of a peroxide catalyst, wherein said oil modified alkyd resin is prepared by reacting (1) a member selected from the group consisting of glyceride oils, their fatty acids and their monoglycerides, (2) a polyhydric alcohol and (3) a polycarboxylic acid having the general formula:

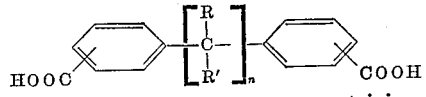

wherein R and R′ are alkyl groups containing from 1 to 4 carbon atoms and n is a whole integer between 1 and 2, inclusive.

5. A process comprising reacting a mixture of o-, m- and p-methyl styrene with an oil modified alkyd resin at a temperature between 110 and 215° C. in a mutually inert solvent and in the presence of a peroxide catalyst, wherein said oil modified alkyd resin is prepared by reacting (1) a member selected from the group consisting of glyceride oils, their fatty acids and their monoglycerides, (2) a polyhydric alcohol and (3) a polycarboxylic acid having the general formula:

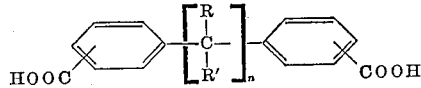

wherein R and R′ are alkyl groups containing from 1 to 4 carbon atoms and n is a whole integer between 1 and 2, inclusive.

6. A process comprising reacting a mixture of o-, m- and p-methyl styrene with an oil modified alkyd resin at a temperature between 110 and 215° C. in a mutually inert solvent and in the presence of a peroxide catalyst, wherein said oil modified alkyd resin is prepared by reacting (1) a member selected from the group consisting of glyceride oils, their fatty acids and their mono-glycerides, (2) glycerin and (3) 4,4′-(2,2-butylidene)dibenzoic acid.

7. A process comprising reacting a mixture of o-, m- and p-methyl styrene with an oil modified alkyd resin at a temperature between 110 and 215° C. in a mutually inert solvent and in the presence of a peroxide catalyst, wherein said oil modified alkyd resin is prepared by reacting (1) a member selected from the group consisting of glyceride oils, their fatty acids and their mono-glycerides, (2) glycerin and (3) 4,4′-(3,3-pentylidene)dibenzoic acid.

8. A process comprising reacting a ring-substituted halostyrene with an oil modified alkyd resin at a temperature between 110 and 215° C. in a mutually inert solvent and in the presence of a peroxide catalyst, wherein said oil modified alkyd resin is prepared by reacting (1) a member selected from the group consisting of glyceride oils, their fatty acids and their monoglycerides, (2) a polyhydric alcohol and (3) a polycarboxylic acid having the general formula:

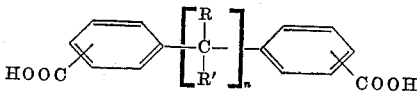

wherein R and R' are alkyl groups containing from 1 to 4 carbon atoms and $n$ is a whole integer between 1 and 2, inclusive.

9. A process comprising reacting p-chlorostyrene with an oil modified alkyd resin at a temperature between 110 and 215° C. in a mutually inert solvent and in the presence of a peroxide catalyst, wherein said oil modified alkyd resin is prepared by reacting (1) a member selected from the group consisting of glyceride oils, their fatty acids and their monoglycerides, (2) a polyhydric alcohol and (3) a polycarboxylic acid having the general formula:

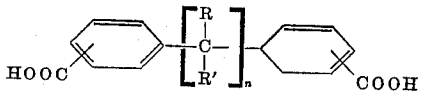

wherein R and R' are alkyl groups containing from 1 to 4 carbon atoms and $n$ is a whole integer between 1 and 2, inclusive.

10. A process comprising reacting a mixture of p-chlorostyrene with an oil modified alkyd resin at a temperature between 110 and 215° C. in a mutually inert solvent and in the presence of a peroxide catalyst, wherein said oil modified alkyd resin is prepared by reacting (1) a member selected from the group consisting of glyceride oils, their fatty acids and their monoglycerides, (2) glycerin and (3) 4,4'-(2,2-butylidene)dibenzoic acid.

11. A process comprising reacting styrene with an oil modified alkyd resin at a temperature between 110 and 215° C. in a mutually inert solvent and in the presence of a peroxide catalyst, wherein said oil modified alkyd resin is prepared by reacting (1) a member selected from the group consisting of glyceride oils, their fatty acids and their monoglycerides, (2) a polyhydric alcohol and (3) a polycarboxylic acid having the general formula:

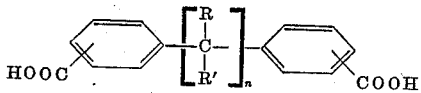

wherein R and R' are alkyl groups containing from 1 to 4 carbon atoms and $n$ is a whole integer between 1 and 2, inclusive.

12. A process comprising reacting styrene with an oil modified alkyd resin at a temperature between 110 and 215° C. in a mutually inert solvent and in the presence of a peroxide catalyst, wherein said oil modified alkyd resin is prepared by reacting (1) a member selected from the group consisting of glyceride oils, their fatty acids and their monoglycerides, (2) glycerin and (3) 4,4'-(2,2-butylidene)dibenzoic acid.

13. A process comprising reacting styrene with an oil modified alkyd resin at a temperature between 110 and 215° C. in a mutually inert solvent and in the presence of a peroxide catalyst, wherein said oil modified alkyd resin is prepared by reacting (1) a member selected from the group consisting of glyceride oils, their fatty acids and their monoglycerides, (2) glycerin and (3) 4,4'-(3,3-pentylidene)dibenzoic acid.

14. A process comprising polymerizing styrene in the presence of a peroxide catalyst with a material selected from the group consisting of a glyceride oil, their fatty acids and their monoglycerides until polymerization is substantially complete and thereafter adding, in alkyd forming proportions, a polyhydric alcohol and a polycarboxylic acid having the general formula:

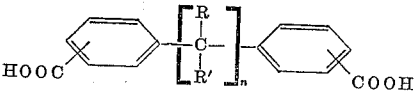

wherein R and R' are alkyl groups containing from 1 to 4 carbon atoms and $n$ is a whole integer between 1 and 2, inclusive, and heating until esterification is substantially complete.

15. A resinous product of (1) a styrene selected from the group consisting of styrene, alkyl styrenes and halo styrenes, (2) a member selected from the group consisting of a glyceride oil, their fatty acids and their monoglycerides, (3) a polyhydric alcohol and (4) a polycarboxylic acid having the general formula:

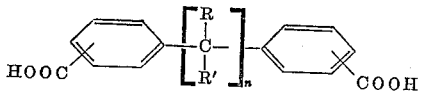

wherein R and R' are alkyl groups containing from 1 to 4 carbon atoms and $n$ is a whole integer between 1 and 2, inclusive.

16. A resinous product of (1) styrene, (2) a member selected from the group consisting of a glyceride oil, their fatty acids and their monoglycerides, (3) a polyhydric alcohol and (4) 4,4'-(2,2-butylidene)dibenzoic acid.

17. A resinous product of (1) styrene, (2) a member selected from the group consisting of a glyceride oil, their fatty acids and their monoglycerides, (3) a polyhydric alcohol and (4) 4,4'-(3,3-pentylidene)dibenzoic acid.

References Cited in the file of this patent

UNITED STATES PATENTS

| | | |
|---|---|---|
| 2,748,092 | Daniels et al. | May 29, 1956 |
| 2,794,822 | Schweitzer | June 4, 1957 |

UNITED STATES PATENT OFFICE
CERTIFICATE OF CORRECTION

Patent No. 2,851,431 September 9, 1958

John C. Petropoulos

It is hereby certified that error appears in the printed specification of the above numbered patent requiring correction and that the said Letters Patent should read as corrected below.

Column 2, line 37, for "trimethyloethane" read -- trimethylolethane --; column 9, line 35, for "insert" read -- inert --.

Signed and sealed this 11th day of November 1958.

(SEAL)
Attest:

KARL H. AXLINE
Attesting Officer

ROBERT C. WATSON
Commissioner of Patents